Sept. 8, 1964  J. R. MEISENBACH  3,147,666
PROFILER
Filed June 11, 1963  4 Sheets-Sheet 1

INVENTOR.
JOHN R. MEISENBACH
BY
ATTORNEY

Sept. 8, 1964   J. R. MEISENBACH   3,147,666
PROFILER
Filed June 11, 1963   4 Sheets-Sheet 2

INVENTOR.
JOHN R. MEISENBACH
BY
ATTORNEY

Sept. 8, 1964

J. R. MEISENBACH 3,147,666

PROFILER

Filed June 11, 1963

INVENTOR.
JOHN R. MEISENBACH
BY
ATTORNEY

Sept. 8, 1964 J. R. MEISENBACH 3,147,666
PROFILER
Filed June 11, 1963 4 Sheets-Sheet 4
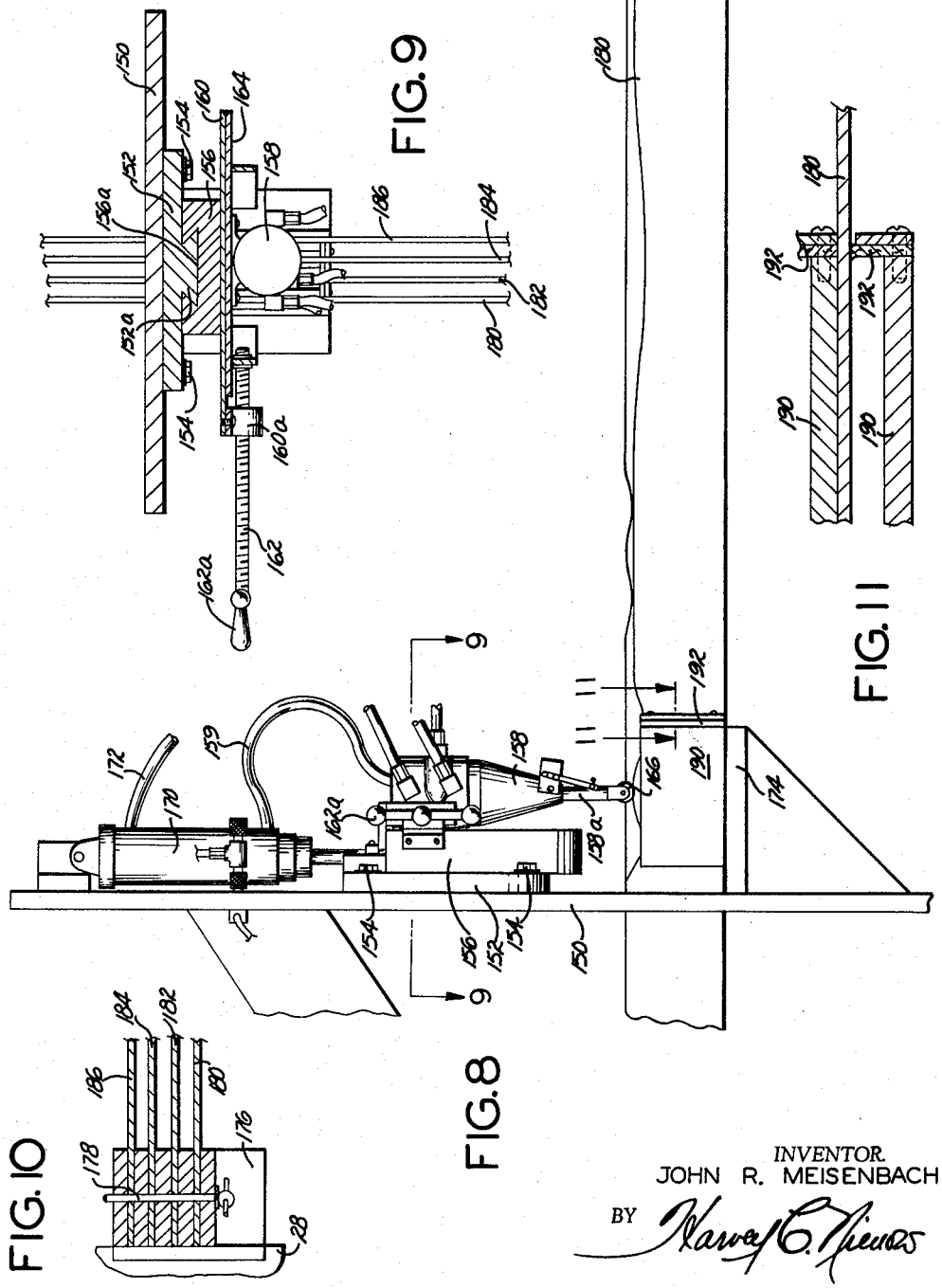
INVENTOR.
JOHN R. MEISENBACH
BY
ATTORNEY

United States Patent Office 3,147,666
Patented Sept. 8, 1964

3,147,666
PROFILER
John R. Meisenbach, Santa Ana, Calif., assignor to Shinn Engineering Incorporated, Santa Ana, Calif., a corporation of California
Filed June 11, 1963, Ser. No. 286,980
14 Claims. (Cl. 90—13.5)

The present invention relates generally to profilers, and more particularly to metal cutting profiling machines which are operable to form unusual surfaces.

For some years, metal forming or cutting profilers have been in use in many different industries. Basically, such profilers have been of either two dimensional or three dimensional operation. Two dimensional profilers have a cutting tool which is movable in accordance with the movement of a stylus or tracer mechanism along a coplanar template. That is, a profiler of this type is operable to move the cutting tool in either of two directions at right angles to each other, or in any direction which is a combination of movements in both such directions. As such, these machines are capable of forming a work piece in accordance with a template wherein all of the profiling movements are made in a single plane.

Three dimensional profilers, on the other hand, are operable to move the cutting tool along any one of three axes disposed at right angles to each other, or in any direction which is a composite of such movements. As such, whereas the two dimensional profiler is capable of moving the cutting tool forward, backward, to the right, to the left, or in any direction which is a combination thereof, the three dimensional profiler has the additional ability to move the tool up and down.

The aforementioned two dimensional profiling machines have been satisfactory for certain applications, particularly where the cutting tool is required to move in any combination of two (coplanar) directions only as described above, thus generating linear or curved surfaces which are, at any point, always perpendicular to the table of the machine. The axis of the cutter of such machines always remains in a vertical position, and, at any instant, the cut resembles a vertical line. The depth of the cut thus formed is determined only by the length of the cutting edge of the cutter, which for this profiling application, is normally the side of the cutter, not the end. The end of the cutter normally does not cut at all, except in cases where corner radii are required at the bottom of a contoured pocket, and in this case a like radius is ground in the cutter. For flat-bottom contoured pockets, the end of the cutter is normally perpendicular to its axis of rotation of the tool.

The cutter of a three dimensional profiler, however, is capable of non-coplanar movement, and hence can form any curve in space. This advantage (over two dimensional profilers) has its limitations, however, in that in the process of machining three dimensional curved forms, the side of the cutter cannot normally be used since its movement normally generates a surface resembling only the exterior contour of the cutter, which cannot be altered during the machining process. Normally, the fixed exterior contour of the cutter cannot be ground in such a manner as to generate the infinite number of differently shaped three dimensional curved forms required.

For certain applications it is desirable to form surfaces on a work piece which are not coplanar and not necessarily continually parallel with any given axis. Modern day technological advances, such as found in the aircraft and space industries, require more sophisticated or advanced machining operations. For instance, certain fuselage members modern aircraft must be tapered along practically all surfaces in accordance with the general taper of the entire fuselage. Such shape and design are necessitated by aero-dynamics considerations and hence cannot be altered at will.

As a result of such machining requirements, there has developed the need for a profiling machine which is not limited to three dimensional operation but rather is capable of cutting virtually any size or shape of surface imaginable.

It is an object of the present invention to provide a profiler which in addition to generating a surface which is variable in the usual three dimensional lineal directions is also operable to form such surface in two angular directions.

Another object of the present invention is to adapt an existing profiler with means for providing movement of the cutting tool in five different directions simultaneously.

Another object of the present invention is to provide a profiler as characterized above which can be used with modern day controls such as magnetic or punch tape machines.

A further object of the present invention is to provide a profiler as characterized which can be operated by hydraulic pressure, mechanical means or electrical equipment, as desired.

Another further object of the present invention is to provide a profiler as characterized above which is extremely accurate in following predetermined layouts and templates.

An additional object of the present invention is to provide a five dimensional profiler as characterized above wherein all of the five relative movements of the cutting tool and work piece can be controlled or programmed by any information storage device which is capable of providing, in a timed sequence, information which is operable to control the effect of fluid pressure, mechanical operation or electrical energy, as the case may be.

A still further object of the present invention is to provide a profiler as characterized above which, in a simple form, utilizes lineal or circular cams for storage of control information.

Another object of the present invention is to provide a profiler as characterized above which is simple and inexpensive to manufacture and which is rugged and dependable in operation.

The novel features which I consider characteristic of my invention are set forth with particularity, in the appended claims. The device itself, however, both as to its organization and mode of operation, together with additional objects and advantages thereof, will best be understood from the following description of specific embodiments when read in connection with the accompanying drawings, in which:

FIGURE 8 is a fragmentary side elevational view of the cam mechanism for controlling the angular relationship about one axis of the tool and work piece;

FIGURE 9 is a fragmentary sectional view taken substantially along line 9—9 of FIGURE 8;

FIGURE 10 is a fragmentary sectional view taken substantially along line 10—10 of FIGURE 1, and FIGURE 11 is a fragmentary sectional view taken substantially along 11—11 of FIGURE 8.

Like reference characters indicate corresponding parts throughout the several views of the drawings.

Figure 1:
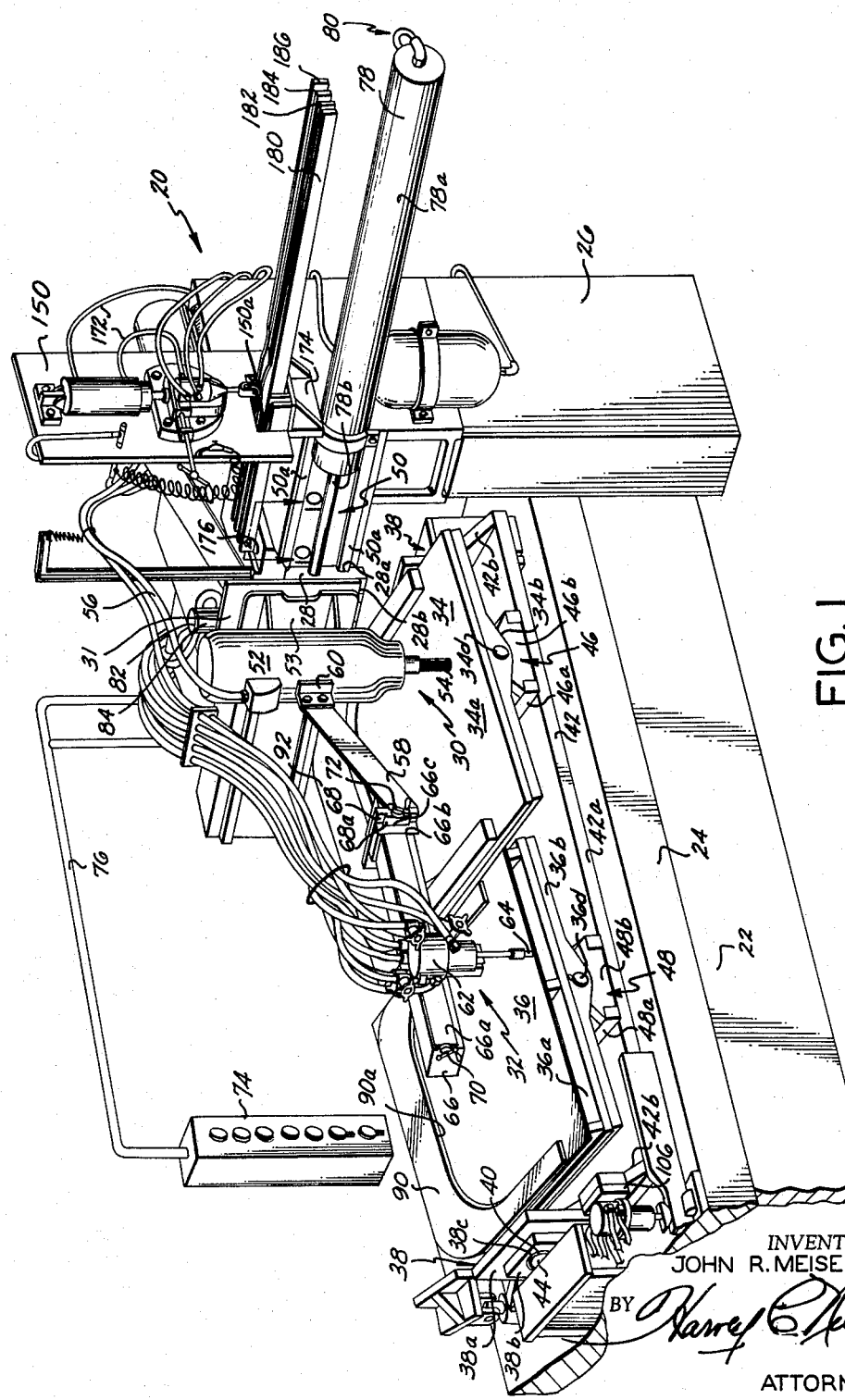
FIGURE 1 is a fragmentary perspective view of a profiler according to the present invention.

Referring to FIGURE 1 of the drawings, there is shown therein a profiling machine 20 according to the present invention. Basically, the machine 20 is of the type commonly referred to as an open-side profiler. It comprises a stationary bed or mounting platform 22 whereon is mounted a movable bed 24 having reverse rectilinear movement on the stationary platform as will hereinafter be described in detail.

In fixed relation to the stationary platform 22 is a supporting column 26 which carries a movable head 28. Attached to head 28 are a cutting mechanism 30 and a stylus or tracer mechanism 32.

As will hereinafter be explained in greater detail, the subject profiler 20 is operated by both electrical and hydraulic power.

The movable bed 24 has an undersurface (not shown) which is formed with suitable elongated interconnecting means which cooperate with the top surface of the stationary member 22 to afford the movable bed reverse rectilinear movement along the length of the stationary member 22. Such interconnecting means may take the form of elongated dove-tail rails and grooves whereby the stationary member and movable bed are restricted to rectilinear movement. However, as will be readily apparent to those persons skilled in the art, any appropriate interconnecting means may be employed to accomplish an aforementioned relative movement.

Mounted on the movable bed 24 are a pair of substantially identical mounting tables 34 and 36 which cooperate with the cutting mechanism 30 and tracer mechanism 32, respectively.

For mounting such tables on bed 24, there is rigidly secured to bed 24 a pair of spaced bearing members 38. Each such bearing member 38 comprises a pair of rigid upstanding support members 38a and 38b formed with aligned openings as shown at 38c for receiving a bearing sleeve 40. To insure the accuracy of operation of the profiling machine 20, the bearing sleeves 40 in the spaced bearing members 38 should be aligned with each other along an axis which is parallel to the direction of movement of the movable bed 24 on the stationary platform 22.

For movement about this axis, there is provided between the bearing members 38 a pivotal support table 42. Table 42 is formed with an elongated support member 42a and triangularly shaped upstanding side members 42b. A pivot pin or shaft 44 is firmly secured to each of the side members 42b, said pins being positioned within the bearing sleeves 40 on the respective bearing members 38. Thus, table 42 is pivotally mounted on movable bed 24 for pivotal movement thereon about an axis parallel to the direction of movement of the bed on the stationary platform.

The tables 34 and 36 are pivotally mounted in side-by-side relation on the elongated support member 42a of table 42. Each such table 34 and 36 is attached to separate support means 46 and 48 positioned on the elongated support member 42a for individual pivotal movement about an axis in a plane at right angles to the axis of rotation of table 42.

To accomplish the foregoing, the table 34 is provided with a table top 34a and a pair of oppositely disposed bearing members 34b and 34c. The support means 46 is formed with a base 46a on support member 42a and a pair of upstanding side members 46b. The oppositely disposed side members 46b of the mounting member 46 are formed with aligned openings for receiving a pivot pin or shaft which also extends through bearing openings in the bearing members 34b and 34c of the table 34. As will be readily understood by those persons skilled in the art, the bearing members 34b and 34c may be secured to the table 34 in any well known manner as by welding, brazing or the use of appropriate fastening means such as bolts or screws. In like manner, the upstanding side members 46b of the mounting member 46 may be secured to the base 46a thereof as desired.

It is contemplated within the scope of the present invention that a single pivot pin or shaft may be employed for pivotally mounting table 34 on mounting means 46. In the alternative, separate pivot pins may be employed at each end of the table if desired.

Table 36 is pivotally mounted on table 42 in a similar manner. Table 36 is provided with a table top 36a and a pair of oppositely disposed bearing members 36b and 36c having aligned through openings as shown at 36d. A mounting member 48 supports the table 36 on table 42, the mounting member 48 having a base 48a and a pair of upstanding side members 48b formed with aligned through openings for receiving a pivot pin as above explained. The table 36 is thereby pivotally mounted on the mounting member 48 to be pivoted about an axis which is transverse of the axis of rectilinear movement of the bed 24 on the stationary platform 22.

The tables 34 and 36, as above explained, are placed in side-by-side relation on support 42. The axis of rotation of such tables on their respective mounting members 46 and 48 must be parallel under all conditions of operation as will hereinafter appear. Also, each such axis of rotation must follow a single plane during rotation of table 42 about its longitudinal axis of rotation, such planes being at right angles to the direction of rectilinear movement of the movable bed as aforedescribed.

As a result of this geometrical relationship of the various axes of rotation and direction of movement, it is seen that the movable bed 24 of profiler 20 is rectilinearly movable in a longitudinal direction and the table 42 together with all components and instrumentalities thereon is pivotal about a longitudinal axis as afforded by the pivot pins 44 within the bearing members 38. Also, each table 34 and 36 is individually pivotal about a transverse axis as afforded by the pivotal connection between each said table and its respective mounting means 46 and 48. The terms longitudinal and transverse as thus used will be employed in the same sense throughout further explanations and descriptions of the present invention.

The supporting column of the profiler 20 is provided with suitable guide means 50 in the form of a pair of guide rails 50a. Such rails are mounted in a stationary position and extend transversely of the direction of rectilinear movement of movable bed 24. Such rails extend transversely over the bed 24 as shown most clearly in FIGURE 1.

Slidably mounted on guide means 50 is the aforementioned movable head 28, such head being formed with suitable grooves for receiving the guide rails 50a. This arrangement causes the head 28 of the profiler to be movable in a transverse direction.

The aforementioned cutting mechanism 30 is securely attached to a mounting plate 31 which is slidably attached to head 28. Cutting mechanism 30 comprises a cylindrically shaped housing 52 wherein is positioned motive power device which may be operated by any desired energy for driving a cutting tool 54. Suitable lead wires within a conduit 56 conduct electrical energy to such device in the event it is an electrically energizable motor to be controlled by the operator as will hereinafter be explained.

Head 28, in addition to being formed with the aforedescribed grooves or slots 28a for cooperation with guide rails 50a, is also formed with a pair of guide rails 28b on the opposite surface thereof. Such guide rails 28b are disposed at right angles to the elongated slots 28a and cooperate with suitably formed slots or grooves on mounting plate 31. This arrangement permits plate 31 to move upwardly and downwardly on head 28 in a direction normal to both the direction of travel of bed 24 and the direction of movement of head 28. The motor housing 52 is secured to mounting plate 51 by a bracket assembly 53.

A bracket 58 one end of which is secured to housing 52 by L-shaped mounting member 60 carries the aforementioned tracer mechanism 32. Such mechanism comprises a tracer valve 62 which is controlled by a tracer spindle or stylus 64 as will hereinafter be explained. Tracer valve 62 is mounted on a support member having a dove-tail slot for cooperation with a dove-tail guide rail on a mounting member 66. Such guide rail is shown in FIGURE 1 at 66a and extends longitudinally of bed 24.

One end 66b of mounting member 66 is provided with a dove-tail groove or slot 66c at right angles to the dove-tail guide rail 66a thereon. Another mounting member 68 secured to one end of bracket 58 is formed with a dove-tail guide rail 68a for receiving the groove 66c of member 66. The rail 68a and groove 66c for cooperation therewith should extend generally at right angles to the guide rail 66a of member 66, generally in the transverse direction of the profiler 20.

Suitable adjustment mechanisms including manually operable handles 70 and 72 are provided for effecting adjustment of tracer mechanism 32 with respect to the cutting mechanism 30. That is, operation of the adjustment mechanism associated with handle 70 causes the tracer mechanism 32 to be moved longitudinally with respect to the cutting mechanism. The mechanism associated with handle 72, on the other hand, effects transverse positioning thereof with respect thereto.

Suitable electrical control means is employed for operating the profiler as will hereinafter become apparent, a control panel or switch box 74 being positioned by suitable support means 76 for easy reach by the operator. In the event the entire apparatus is hydraulically operated, such control panel would comprise suitable flow control valves for controlling the various motive power devices.

The mechanism for moving bed 24 on stationary platform 22 comprises suitable hydraulic actuators (not shown). A similar hydraulic actuator is shown at 78 in FIGURE 1 for moving the head 28 in its transverse direction on guide means 50. Actuator 78 comprises a stationary cylinder 78a wherein is slidably positioned a piston having a piston rod 78b attached to the head. Suitable conduits and connectors therefor as shown at 80 are employed for conducting fluid pressure to and from actuator 78 as will hereinafter be explained.

For moving cutting mechanism 30 and tracer mechanism 32 in the vertical directions, a hydraulic actuator 82 is provided having a cylinder 84 wherein a piston is movably positioned. A piston rod extends from the cylinder and is connected by suitable levers (not shown) to the movable mounting plate 31. Thus, the hydraulic actuator 82 is operable to control the vertical position of the cutting mechanism and tracer assembly.

The mechanism thus far described operates generally as follows.

Proper manipulation of the switches of control panel 74 permits the operator to complete various electrical circuits. Firstly, the drive motor for cutting tool 54 is energized through the lead wires within conduit 56 to cause cutting tool 54 to rotate at the proper speed about the vertical axis.

Suitable manipulation of the switches of control panel 74 also energizes certain motor driven pumps which bring the hydraulic fluid in the various hydraulic lines up to proper operating pressure. Such hydraulic pressure is necessary for moving bed 24 in its longitudinal directions, and for moving the cutting and tracer mechanisms transversely and vertically.

A template 90 having a tracing surface or edges 90a is properly secured to the template table 36. In similar fashion, a work piece as shown at 92 is secured to the cutting table 34. The adjustment mechanisms as controlled by manually operable handles 70 and 72 are then adjusted to insure that the cutting tool 54 travels relative to the work piece in the same manner as the tracer mechanism 32 travels relative to the template. That is, the distance between the cutting tool 54 and the stylus 64 must be equal to the distance between the transverse axes of rotation of the tables 34 and 36. To further insure accurate operation of the apparatus, the tool and stylus should be longitudinally aligned.

Following energization of the drive motor for tool 54 and operation of the pumps for the hydraulic system, it is first necessary for the operator to position the stylus 64 of the tracer mechanism 32 adjacent the template edge 90a to be followed. To accomplish this, the operator moves the stylus 64 accordingly. The stylus is mounted with respect to the tracer valve 62 by means of a universal connection such that it can be moved in reverse longitudinal directions, reverse transverse directions, reverse vertical directions or any combination of such movements. That is, stylus 64 can be simultaneously moved partially in a longitudinal direction, partially in a transverse direction, and partially in a vertical direction, thereby causing the cutting tool 54 and the work piece 92 to be moved relative to each other in the corresponding way.

Suffice for this description to realize that tracer valve 62 is operable to respond to such movement of stylus 64 to control the flow of hydraulic fluid substantially as follows.

When stylus 64 is moved in a longitudinal direction, tracer valve 62 allows hydraulic fluid to flow to the aforementioned hydraulic actuator which moves bed 24 on stationary platform 22. Thus, if stylus 64 as shown in FIGURE 1, is actuated to the right in a longitudinal direction, tracer valve 62 applies fluid pressure such that the bed 24 is moved to the left in a longitudinal direction. The net result, of course, is that relative movement is effected between the tool and the work piece 92. Conversely, if stylus 64 is moved to the left as shown in FIGURE 1, the bed 24 is caused to be moved to the right by the operation of tracer valve 62, the tool 54, in effect, thereby having movement to the left relative to the work piece 92.

In the event stylus 64 is urged in a transverse direction, for instance forwardly with respect to the machine as shown in FIGURE 1, the tracer valve 62 applies pressure to hydraulic actuator 78 so as to cause head 28 to be moved in a forward traverse direction on guide means 50. Such movement of head 28, of course, carries with it the cutting mechanism 30 and tracer mechanism 32. The reverse action, of course, takes place when the stylus 64 is urged rearwardly in a transverse direction, namely the tracer valve 62 causes hydraulic actuator 78 to retract head 28 so to move the cutting tool and the stylus as a unit in the rearward transverse direction.

Upon the application of pressure in a vertical direction on stylus 64, tracer valve 62 provides fluid flow to hydraulic actuator 82 such as to effect the corresponding movement of mounting plate 31 on head 28. That is, upon the application of upward pressure on stylus 64, tracer valve 62 causes hydraulic actuator 82 to move mounting plate 31 upwardly on head 28.

It is thus seen that the work piece 92 can be shaped in accordance with the template 90 merely by the operator following the template edge 90a with the stylus 64 although the bed 24 moves longitudinally and the tool move transversely and vertically, the only important relationship is the relative movement therebetween.

The aforedescribed profiling operation, however, has certain limitations. Since cutting tool 54 is generally a milling tool it generates or cuts a relatively wide surface, limited only by the length of the end mill 54. That is, at any given instant it cuts a line of given length such that as the tool moves it generates a surface of predetermined depth. Although this surface may be moved longitudinally, transversely and vertically as above explained, the depth of such surface remains at a fixed angle with respect to the work table. This, of course, is determined by the initial position of the tool with respect to the aforementioned longitudinal, transverse and vertical axes.

To permit controlled variation in the position of such depth dimension, the hereinafter described structure is employed.

Figure 2:
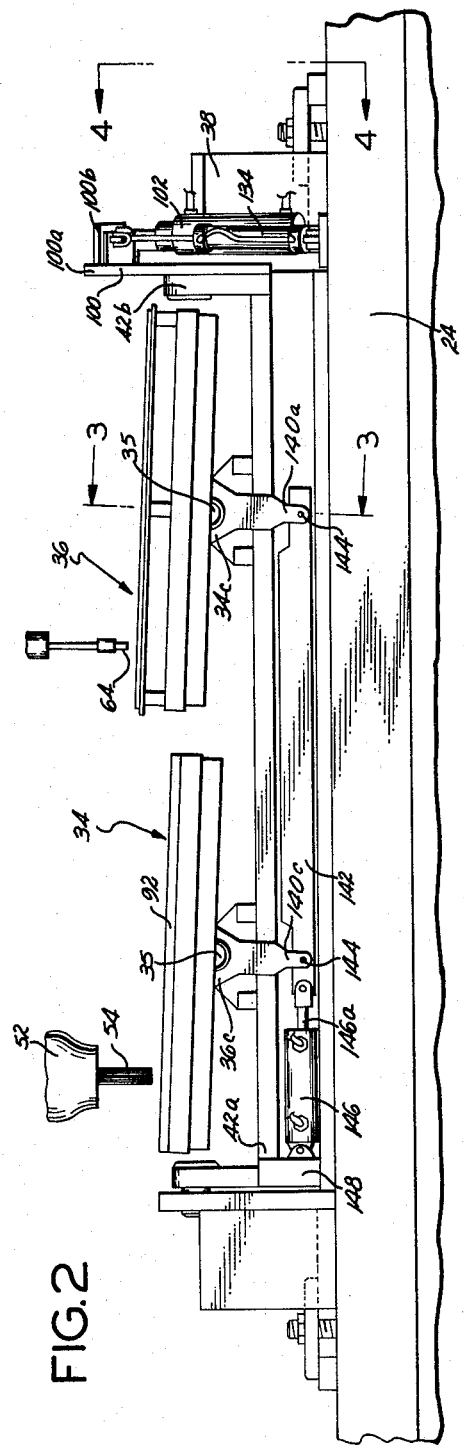
FIGURE 2 is a fragmentary elevational view of the movable bed of the profiler of FIGURE 1.
Figure 4:
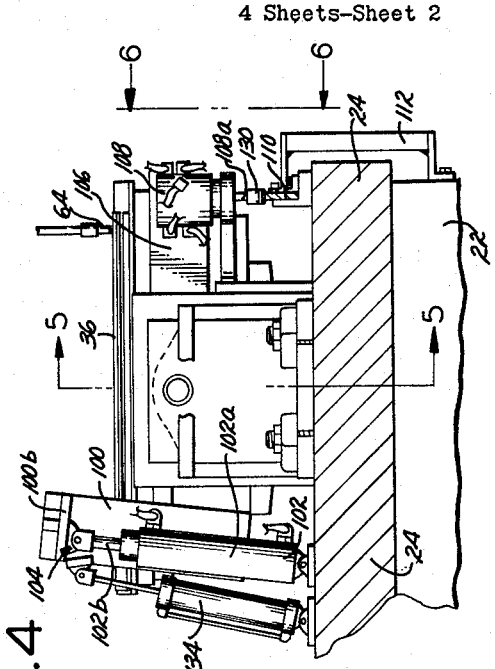
FIGURE 4 is a fragmentary sectional view taken substantially along line 4—4 of FIGURE 2.
Figure 3:
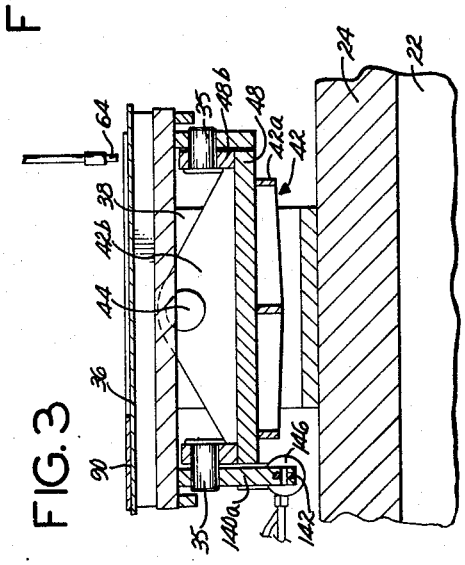
FIGURE 3 is a fragmentary sectional view taken substantially along line 3—3 of FIGURE 2.

As shown most clearly in FIGURES 2 and 4 of the drawings, a mounting bracket 100 is firmly secured to one of the triangularly shaped end members 42b of the pivotal support table 42. Such bracket comprises support member 100a which is secured to a lateral attachment member 100b.

A hydraulic actuator 102 is operatively interposed between the movable bed 24 and the attachment member 100b of the bracket 100. Actuator 102 comprises a cylinder 102a wherein is slidably positioned a fluid pressure responsive piston which activates a piston rod 102b one end of which is attached to mounting member 100b as shown at 104.

Firmly secured to one of the triangularly-shaped end members 42b, as shown in FIGURE 1, is a bracket 106 which carries a valve member 108 for longitudinal and angular movement with table 42. Valve member 108 comprises a rectilinearly movable plunger 108a which upon movement in a vertical direction varies the flow of hydraulic fluid as will hereinafter become apparent.

A lineal cam member 110 (FIGURES 1, 6 and 7) is mounted in a stationary position for actuation of valve member 108 as the latter moves with table 42. To accomplish this, stationary mounting means 112 firmly secured to stationary platform 22 is attached to one end of cam member 110 as shown most clearly in FIGURE 6. Such cam member is formed with a suitable cam surface 110a which defines the control intelligence or information for rotating table 42 as will hereinafter appear.

Cam member 110 is slidably supported on bed 24 on an L-shaped bracket 114. Such bracket is formed with an elongated side member 114a which carries a bearing member 116 against which one side of cam member 110 is permitted to slide. Another L-shaped bracket 118 is mounted on bracket 114 by means of a bolt 120, such bracket 118 comprising a small bearing member 122 for slidable engagement with the other side of cam member 110. A roller or wheel 124 having an axle or shaft 126 is rotatably mounted in bracket 114 immeediately beneath cam member 110 to support said cam so as to permit free and easy relative movement between cam member 110 and bed 24. One or more mounting bolts as shown at 128 are employed to firmly secure the bracket 114 to movable bed 24.

Figure 6:
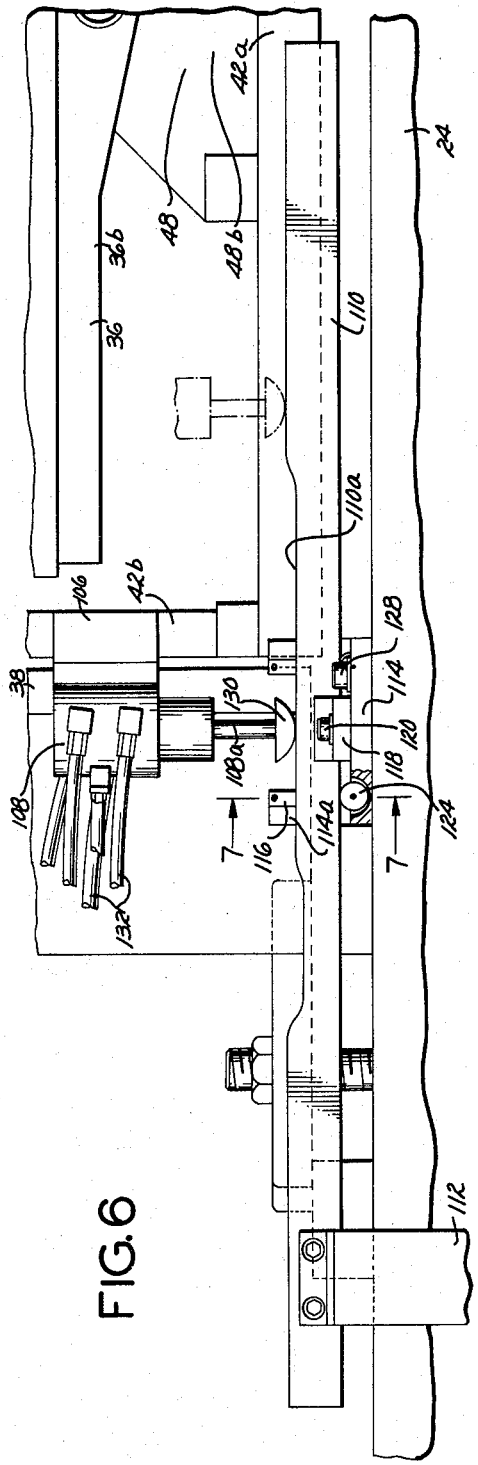
FIGURE 6 is a fragmentary side elevational view of a portion of the movable bed of the profiler taken substantially along line 6—6 of FIGURE 4.
Figure 7:
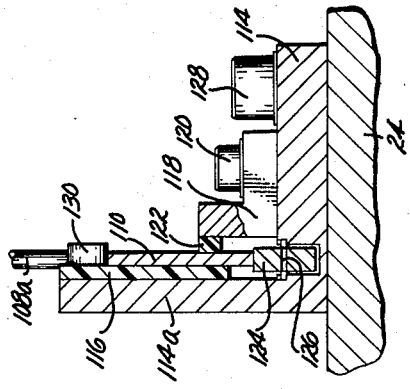
FIGURE 7 is a fragmentary sectional view taken substantially along line 7—7 of FIGURE 6.
Figure 5:
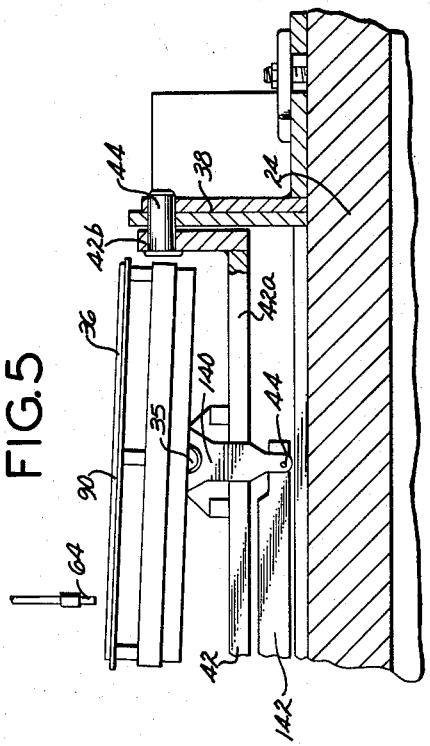
FIGURE 5 is a fragmentary sectional view taken substantially along line 5—5 of FIGURE 4.

As shown most clearly in FIGURE 6 of the drawings, the plunger or actuating shaft 108a of valve 108 is provided at its lower end with an arcuately shaped bearing member 130 which rests against the cam surface 110a. As such, the plunger 108a is a cam follower for cam member 110 as valve 108 is moved relative to cam member 110.

By means of suitable hydraulic conduits as shown at 132, the valve 108 is connected to hydraulic actuator 102. As a result, the table 42 is rotated about the axis afforded by shafts 44 in accordance with the predetermined size and shape of cam member 110. As will be apparent to those persons skilled in the art, such rotation of table 42 must be related to the template 90 and work piece 92 since the cam member is operated, in effect, by its relative movement with respect to the template and work piece. Thus, the angular control information or intelligence of cam surface 110a can be predetermined and related to the template and work piece.

To insure the accuracy of table 42 responding to the control information formed in cam member 110, there is provided between movable bed 24 and bracket 100 a fluid dampener 134 which serves to eliminate abrupt shock affects in the operation of hydraulic actuator 102 and dampens fundamental harmonic vibrations of the system.

As shown most clearly in FIGURE 2 of the drawings, each table 34 and 36 is formed with a bearing member 34c and 36c, respectively, having a depending end portion. Such bearing members, of course, are integral with the respective tables and cooperate with the bearing members on the opposite ends to pivotally mount such tables on the mounting means 46 and 48 as above, described.

A link 142 rotatably connects the depending end portions of such bearing members 34c and 36c by means of pivot pins 144. A hydraulic actuator 146 is interposed between one end of link 142 and a mounting bracket 148 which is secured as by welding, brazing or the like, to the other side of member 42a of pivotal table 42. Actuator 146, of course, comprises the usual cylinder wherein a piston is rectilinearly movable, there being a piston rod 146a one end of which is rotatably fastened to the link 142.

The aforedescribed arrangement permits hydraulic actuator 146 to simultaneously pivot the tables 34 and 36 about their respective transverse axes of rotation. That is, by suitable operation of actuator 146, the link 142 can be moved to the right as shown in FIGURE 2 to cause the tables 34 and 36 to be simultaneously pivoted in a counterclockwise direction. In like manner, actuator 146 is also operable to move link 142 to the left so as to cause such tables to be simultaneously pivoted in a clockwise direction.

As shown most clearly in FIGURES 1, 8 and 9, there is provided on mounting column 26 of the profiling machine 20 a stationary mounting panel 150. Attached to such panel is a mounting plate 152 formed with a dovetail guide rail 152a. The mounting plate 152 is secured to stationary panel 150 by means of mounting bolts 154 such that the guide rail 152a is disposed in a generally vertical direction.

A movable mounting member 156 formed with a slot or through opening 156a for cooperation with guide means 152a is adjustably attached to member 152 as shown most clearly in FIGURE 9 of the drawings. Such arrangement enables mounting member 156 to be moved in a vertical direction with respect to stationary mounting plate 150. Adjustably secured to member 156 is a hydraulic valve 158. To accomplish this, there is secured to mounting member 156 a plate 160 one end of which is provided with an offset 160a having a threaded through opening. An adjustment screw 162 is threadedly mounted within this opening and is attached to a horizontally movable mounting plate 164 which carries the aforementioned hydraulic valve 158. A handle 162a is manually operable for turning the screw 162, as will hereinafter appear, to effect certain adjustments in the position of valve 158.

The valve 158 is on the order of the aforedescribed valve 108 in that it comprises a plunger or actuating shaft 158a which is rectilinearly movable to effect suitable control functions. The lower end of plunger 158a is provided with a roller 166 for following a linear cam member so as to cause plunger 158a to function as a cam follower.

Mounted above valve 158, is a pressure transmitting cylinder or actuator 170 mounted on stationary mounting panel 150. Actuator 170 comprises a piston which carries a piston rod one end of which is secured to movable mounting plate 156 for altering the position of valve 158 on mounting plate 150 as will hereinafter appear. Valve 158 is connected to actuator 170 by a hydraulic conduit 159, and actuator 170 is connected by suitable hydraulic conduits 172 to the hydraulic actuator 146 for control of the angular position of tables 34 and 36 as will hereinafter become apparent.

As shown most clearly in FIGURE 1 of the drawings, the lower end portion of mounting panel 150 is formed with a generally square or rectangular opening 150a. Immediately there beneath, there is provided a small bracket or platform member 174 which cooperates with opening 158 to provide a through opening.

Attached securely to movable head 28 is another bracket or platform member 176 for movement relative to member 174. Member 176 is provided with one or more upstanding partition walls wherein a fastening pin 178 is positioned as shown most clearly in FIGURE 10 of the drawings.

A plurality of lineal cam members 180, 182, 184 and 186 are positioned in spaced relation on the bracket members 174 and 176, the forward end of each thereof being secured to the partition walls on bracket 176 by means of the aforementioned pin 178. Such lineal cam members merely rest on the ledge afforded by bracket 174 so as to be slidable thereon during movement of head 28 in the transverse direction.

Each of the aforementioned cam members is formed with an elongated cam surface along its upper edge. The roller 166 of the valve member 158 is positioned on any one of such cam surfaces to be actuated thereby as head 28 is moved transversely. The aforedescribed adjustment means comprising manually operable screw 162 is effective for positioning the cam following on the desired one of the cam members 180, 182, 184 and 186.

To maintain such elongated cam members in proper relation, suitable guide means in the form of parallel support members 190 are secured to the bracket member 174. Resilient bearing means as shown at 192 is positioned on either side of the cam members to maintain them in proper position on the bracket.

The above described profiler operates generally as follows.

The profiling function as above described wherein the cutting tool 54 is actuated by the stylus so as to be moved relative to the work piece 92 in the longitudinal, transverse and vertical directions is still operational. However, as the bed 24 is being moved longitudinally so as to cause the cutting tool 54 to make a longitudinal cut in work piece 92, the hydraulic valve 108 is moved therewith over the cam surface 110a of member 110. As such relative motion takes place, a change in the cam surface causes the plunger 108a to effect a change in the amount of hydraulic fluid applied to actuator 102.

Valve member 108, as well as valve member 158 as will hereinafter appear, is constructed such that plunger 108a therein has an intermediate position wherein no hydraulic fluid is permitted to flow to actuator 102. However, upon movement of the plunger to either side of such intermediate position fluid is caused to flow to actuator 102, the direction of such flow depending on the direction of movement of the plunger from the intermediate or "off" position.

Since valve 108 is fixed relative to table 42 it moves with it relative to cam member 110. The control function of valve 108 is oriented to the motion of table 42 such that as plunger 108a moves under the influence of cam 110, the valve 108 is caused to move table 42 such as to return valve 108 to its off or intermediate position. More specifically, as plunger 108a is caused by cam surface 110a to drop or be extended with respect to the valve body of valve 108, said valve causes hydraulic fluid to flow to actuator 102 so as to pivot table 42 about its pivot pins 44 in the clockwise direction as shown in FIGURE 4 of the drawings. Such motion of table 42 causes the valve body of valve 108 to follow the motion of plunger 108a until the plunger and valve body are in the intermediate relative positions so that flow of fluid to actuator 102 is interrupted. Thus, valve 108 has been caused to meter a specific quantity of fluid to actuator 102 in accordance with the particular shape of cam surface 110a. Such specific quantity of fluid, of course, effects a specific angular movement of table 42. Thus, the position of table 42 is controlled in accordance with the shape of cam surface 110a of cam member 110.

It is thus seen that as the cutting tool 54 makes a longitudinal cut the table 42 is pivoted about its longitudinal axis to change the angular relationship between the cutting tool 54 and the work piece 92, and between the stylus 64 and the template 90. Such change in angular relationship is within a transverse plane so that the longitudinal cut being made by the cutting tool is caused to change accordingly.

It should be particularly noted that since both of the tables 34 and 36 are mounted on the pivotal table 42, both the cutting tool and the stylus are maintained in the same relationship to the work piece 92 and template 90 respectively. This means that whatever affect such change in angular relationship might have on the transverse placement of the cutting tool, the same change in relationship takes place between the stylus and template 90. As a result, the stylus, as held against the edge 90a of the template 90, continues to be the controlling reference element for the path of the cutting tool 54. That is to say, whatever transverse component of movement is generated by the rotation of the table 42 about the axis of pivot pins 44 (which axis may very well be transversely removed from the surface being cut) the corresponding transverse component of movement is generated with respect to the placement of stylus 64 against the template 90. Thus, such transverse component of movement is cancelled.

Transverse movement of cutting mechanism 30, as effected by stylus 64, causes cam members 180, 182, 184 and 186 to be moved with respect to valve member 158. This necessarily results since the forward ends of such cam members are firmly secured relative to head 28.

As such cam members are so actuated, the roller 166 is caused to follow the cam surface on which it is positioned. The plunger 158a of valve member 158 is thus moved so as to cause variations in the hydraulic pressure applied to actuator 146 through actuator 170. Actuator 146, of course, controls the angular position of tables 34 and 36 on their transverse axes.

As above described with respect to valve member 108, valve member 158 has an intermediate or "off" position as defined by the relationship between the valve body and the plunger or stem 158a. Movement of plunger 158a by one of the cam members 180, 182, 184 and 186 causes hydraulic fluid to flow to actuator 170. The piston of actuator 170 is mechanically connected to the slidable mounting member 156, and hydraulically connected to actuator 146. Thus hydraulic fluid from valve 158 effects the dual functions of causing actuator 146 to pivot the tables 34 and 36 about their separate transverse axes, and moves the valve body of valve member 158 so as to return said valve to its off position.

Thus, the relative angular disposition between the cutting tool 54 and work piece 92, and between stylus 64 and template 90 is varied during transverse movement of head 28. As a result, the angular position of the surface generated by a transverse cut is varied as desired.

It should be noted that all of the various functions as above described can be effected simultaneously. It is possible to have cutting tool 54 cut a surface which is a composite or combination of the aforedescribed longitudinal, transverse and vertical functions. In addition thereto, the tables 34 and 36 may, at the same time, be pivoted about both their longitudinal and transverse axes of rotation. As a result, the cutting tool 54 is caused to generate a surface of predetermined depth which varies in any desired manner in accordance with the path followed by the stylus 64 and the information formed in the longitudinal and transverse cam members.

It is contemplated within the scope of the present invention that the longitudinal and transverse lineal cam members are merely information storage devices which control pivotal actuating means in accordance with the longitudinal and transverse relative positions. Any other type of information storage equipment which is responsive to or can be coordinated with longitudinal movement of the bed and transverse movement of head 28, and which is capable of controlling hydraulic actuators, mechanical systems or electrical systems associated therewith, may be substituted for such lineal cams. For instance, it is contemplated within the scope of this invention that modern day tape controlled mechanisms could be employed for controlling the hydraulic pressure applied to actuators 102 and 164. In fact, it is within the scope of the present invention that either magnetic or punched tape control apparatus also may be used for controlling the hydraulic actuators governed by tracer valve 62 and the hydraulic valves 108 and 158. This, of course, would eliminate the need for the table 36, tracer valve 62, and the various lineal cam members as well as the follower valves associated therewith. In place of these components, there would be a tape controlled machine which would have five separate channels carrying independent signals for effecting the above described three linear cutting movements and two angular cutting movements. The relative positioning of such signals on a single tape, of course, could determine the relationship between the various movements so as to provide the desired compound cuts.

It is also contemplated within the scope of the present invention that the novel concepts employed herein are not limited to metal cutting or forming equipment. Rather, it is believed that the subject invention may be employed on virtually any type of profiling or milling equipment regardless of the actual work being performed.

It is thus seen that the present invention provides apparatus which can alter the relationship between a work performing tool and a work piece in any conceivable manner.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A profiling machine comprising in combination, a stylus, a template having a profile surface to be followed by said stylus, a cutting tool to be moved relative to a workpiece to effect cutting of the latter, means interconnecting said stylus and said cutting tool to cause said cutting tool to move relative to said workpiece in accordance with the relative movement between said stylus and said template, actuating means for effecting relative rotation between said workpiece and said cutting tool, and control means for said actuating means operable in response to and during movement of said stylus relative to said template to cause said actuating means to effect predetermined rotation of said workpiece relative to said cutting tool, whereby said tool is caused to form said workpiece in accordance with said template and said predetermined rotation of said workpiece.

2. A profiling machine according to claim 1, wherein said cutting tool is operable to cut a surface of predetermined width and said interconnecting means is operable to move said cutting tool along three coordinate axes, the axis of rotation of said workpiece being substantially at right angles to the width dimension of said surface whereby rotation of said workpiece during relative movement between said stylus and said template causes said tool to generate a correspondingly curved surface.

3. A profiling machine comprising in combination, a stylus, a template having an endless profile surface to be followed by said stylus, a cutting tool to be moved relative to a workpiece to effect cutting of the latter, means interconnecting said stylus and said cutting tool to cause said tool to move relative to said workpiece in accordance with the relative movement between said stylus and said template to thereby contour said workpiece according to said endless profile surface, actuating means for effecting relative rotation between said workpiece and said cutting tool, and control means for said actuating means operable in response to and during movement of said stylus relative to said template to cause said actuating means to effect predetermined rotation of said workpiece relative to said cutting tool, whereby said tool is caused to contour said workpiece in accordance with said template and said predetermined rotation of said workpiece.

4. A profiling machine according to claim 3, wherein said actuating and control means are operable to effect rotation of said workpiece about two axes at right angles to each other.

5. A profiling machine according to claim 4, wherein said cutting tool is operable to cut a surface of predetermined width and said interconnecting means is operable to move said cutting tool along three coordinate axes, both of said axes of rotation of said workpiece being substantially at right angles to the width dimension of said surface whereby rotation of said workpiece during relative movement of said stylus and said template causes said tool to generate a correspondingly curved surface.

6. A profiling machine comprising in combination, a stylus, at least one pivotal table for supporting a workpiece and a template having a profile surface to be followed by said stylus, a cutting tool to be moved relative to said workpiece to effect cutting thereof, means interconnecting said stylus and said cutting tool to cause said cutting tool to move relative to said workpiece in accordance with the relative movement between said stylus and said template, actuating means for effecting pivotal movement of said table relative to said cutting tool, and control means for said actuating means operable in response to and during movement of said stylus relative to said template to cause said actuating means to effect predetermined rotation of said table and workpiece thereon relative to said cutting tool, whereby said tool is caused to form said workpiece in accordance with said template and said predetermined rotation of said table.

7. A profiling machine comprising in combination, a stylus, a template having a profile surface to be followed by said stylus, a cutting tool, a workpiece to be cut by said tool, a separate table for each of said template and said workpiece, each of said tables being pivotal about two axes at right angles to each other, means interconnecting said stylus and said cutting tool to cause said tool to move relative to said workpiece in accordance with the relative movement between said stylus and said template, means affording connection between said tables to cause them to pivot together about their said axes, actuating means for effecting relative rotation of said tables to cause said template and workpiece to be pivoted accordingly with respect to said stylus and cutting tool respectively, and control means for said actuating means operable in response to and during movement of said stylus relative to said template to cause said actuating means to effect predetermined rotation of said tables, whereby said tool is caused to form said workpiece in accordance with said template and said predetermined rotation of said tables.

8. An open-side three dimensional profiler comprising in combination interconnected stylus and cutting tool for movement together relative to a template and work piece respectively to cause said tool to form said work piece with a surface which is variable in three dimensions in accordance with the shape of said template, a support member for supporting the work piece, mounting means for said support member affording pivotal movement thereof about a given axis, actuating means for said support member to pivot it about said given axis, and control means for said actuating means responsive to relative movement of said tool and work piece to cause said actuating means to rotate said support member, whereby said tool is operable to form a surface on said work piece which rotates about said given axis.

9. An open-side three dimensional profiler comprising in combination interconnected stylus and cutting tool for movement together relative to a template and work piece respectively to cause said tool to form said work piece with a surface which is variable in three dimensions in accordance with the shape of said template, a support member for supporting the work piece, mounting means for said support member affording pivotal movement thereof about two axes each of which is parallel to one of said dimensions, separate actuating means for pivoting said support member about its two axes, and control means for each of said actuating means responsive to relative movement of said tool and work piece along the respective dimension to cause said actuating means to rotate said support member whereby said tool is operable to form a surface which is variable in three linear directions and two angular directions.

10. A profiling machine comprising in combination, a stationary bed, a movable bed on said stationary bed for movement in longitudinal opposite directions, a cutting mechanism comprising a cutting tool movably mounted relative to said stationary bed for movement in opposite directions transversely of said longitudinal directions, a stylus connected to said cutting tool to control the movement thereof along said transverse directions, operating means interposed between said stylus and said movable bed to cause said stylus to control movement of said movable bed along said longitudinal directions, a work piece supporting table pivotally mounted on said movable bed for pivotal movement about axes parallel to each of said longitudinal and transverse directions, a template supporting table mounted on said movable bed for pivotal movement thereon about the axes parallel to each of said longitudinal and transverse directions, actuating means for said tables to effect rotation thereof about their respective axes, and control means for said actuating means responsive to relative movement of said movable bed and cutting tool, whereby the position of said movable bed on said stationary bed controls rotation of said tables about the axes thereof parallel to said longitudinal directions and the position of said cutting tool relative to said stationary bed controls rotation of said tables about the axes thereof parallel to said transverse directions.

11. A profiling machine according to claim 10 wherein said stylus and cutting tool are also movable in opposite directions normal to both said longitudinal and transverse directions whereby said stylus and tool are operable in three linear directions and two angular directions simultaneously relative to said template and work piece respectively to thereby form said work piece with any desired curved surface.

12. A profiling machine according to claim 10 wherein said work piece supporting table and said template supporting table are caused to pivot about a common longitudinal axis and separate transverse axes.

13. A profiling machine according to claim 12 wherein said actuating means comprises a first fluid pressure responsive device for pivoting said tables about said longitudinal axis and a second fluid pressure responsive device for simultaneously pivoting said tables about their respective transverse axes.

14. A profiling machine according to claim 13 wherein said control means for said pressure responsive devices comprises individual cam members and cam followers thereof, each said cam follower including a fluid pressure control valve for controlling the fluid pressure applied to the respective pressure responsive device.

References Cited in the file of this patent
UNITED STATES PATENTS

| | | |
|---|---|---|
| 1,073,547 | Tunes | Sept. 16, 1913 |
| 2,660,930 | De Vlieg et al. | Dec. 1, 1953 |